United States Patent

Gareis et al.

Patent Number: 5,355,427
Date of Patent: Oct. 11, 1994

[54] GAS BLOCKED FIBER OPTIC TRANSMISSION

[75] Inventors: Galen M. Gareis, Richmond; Richard C. Allen, Liberty, both of Ind.

[73] Assignee: Belden Wire & Cable Company, Richmond, Ind.

[21] Appl. No.: 6,574

[22] Filed: Jan. 21, 1993

[51] Int. Cl.$^5$ ............................................. G02B 6/44
[52] U.S. Cl. ................................. 385/103; 385/106; 385/112; 385/113
[58] Field of Search ............... 385/102, 103, 104, 105, 385/106, 107, 108, 109, 110, 111, 112, 113; 156/242

[56] References Cited

U.S. PATENT DOCUMENTS

| | | | |
|---|---|---|---|
| 4,457,797 | 7/1984 | Hatchadoorian et al. | 156/242 |
| 4,515,435 | 5/1985 | Anderson | 385/103 |
| 4,645,298 | 2/1987 | Gartside, III | 385/103 X |
| 4,720,164 | 1/1988 | Oestreich | 385/103 |
| 4,859,024 | 8/1989 | Rahman | 385/112 |

Primary Examiner—Rodney B. Bovernick
Assistant Examiner—Phan Thi Heartney
Attorney, Agent, or Firm—Laff, Whitesel, Conte & Saret

[57] ABSTRACT

A gas blocked fiber optic cable (10). A cable (10) having a fiber glass epxoy rod (12) which is top coated with EVA-Copolymer (28) and surrounded by fiber optic cables (16). Optical fibers (16) are enclosed in buffer tubes (18) filled with gel (20). Interstitial filling (28) surrounds buffer tube (18). Acid terpolymer top coat (24) bonds filler (28) to buffer tubes (18) preventing gas migration throughout the length of the cable. Black thermo plastic elastomer (30) layer surrounds filler (28) which is surrounded by the outer most polyethylene jacket (32) which is UV resistant.

16 Claims, 1 Drawing Sheet

GAS BLOCKED FIBER OPTIC TRANSMISSION

BACKGROUND OF THE INVENTION

This invention relates to electronic data cables in general and in particular to fiber optic cables which prevent high pressure gas from migrating the length of the cable.

In certain applications utilizing electronic data cables, it is very important that high pressure gases be prevented from migrating the length of the data cable. One such application is in cables used to monitor down hole nuclear tests. Migration of the high pressure gases the length of the cable would contaminate sensitive equipment and personnel. For example, Department of Energy-Nevada-Fiber Optic (DOE-NV-FO) specifications require zero leakage and zero evidence of any displacement, protuberance, rupture, or change throughout each test specimen, after bending and temperature cycling preconditioning, during the 862KPA (125 Pslg) minimum gas block test period specified in the purchase order or detail specification.

In the past, no cables designed as gas blocked cables were reliable. The industry has accepted as a compromise gas "blockable" cables in which metal bands or other means were installed around the cable to prevent migration of high pressure gases along the length of the cable.

SUMMARY OF THE PRESENT INVENTION

In the present invention, an acid terpolymer top coat is applied over the plastic Polybuthylene Terphthalate (PBT) buffer tubes to bond the tube to the Ethylene Vinyl Acetate/Ethylene Acrylic Acid (EVA/EAA) interstitial filling. The acid terpolymer is applied to the plastic PBT buffer tube while the tube is hot. This may be done during a coextrusion process, or performed off line in the secondary extrusion operation.

DETAILED DESCRIPTION OF THE INVENTION

Figure 1:
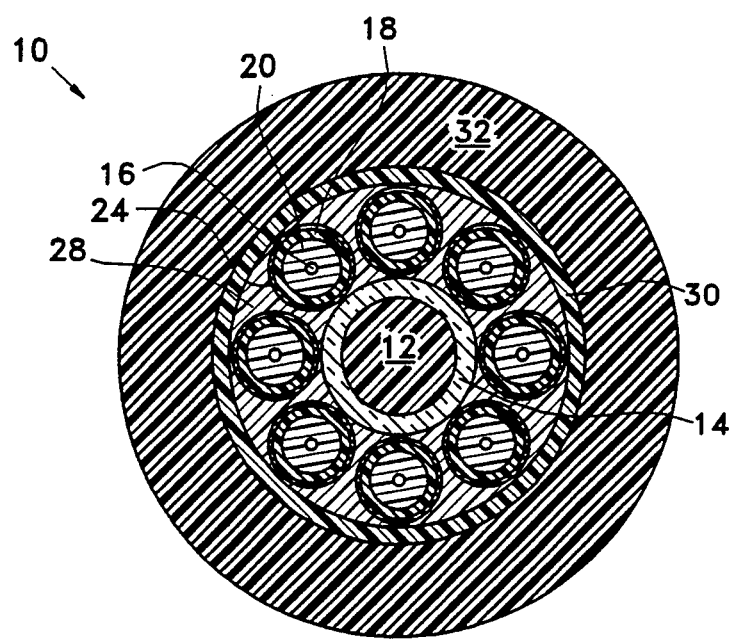
FIG. 1 shows a sectional view of a high pressure gas blocked cable according to the present invention.
Figure 2:
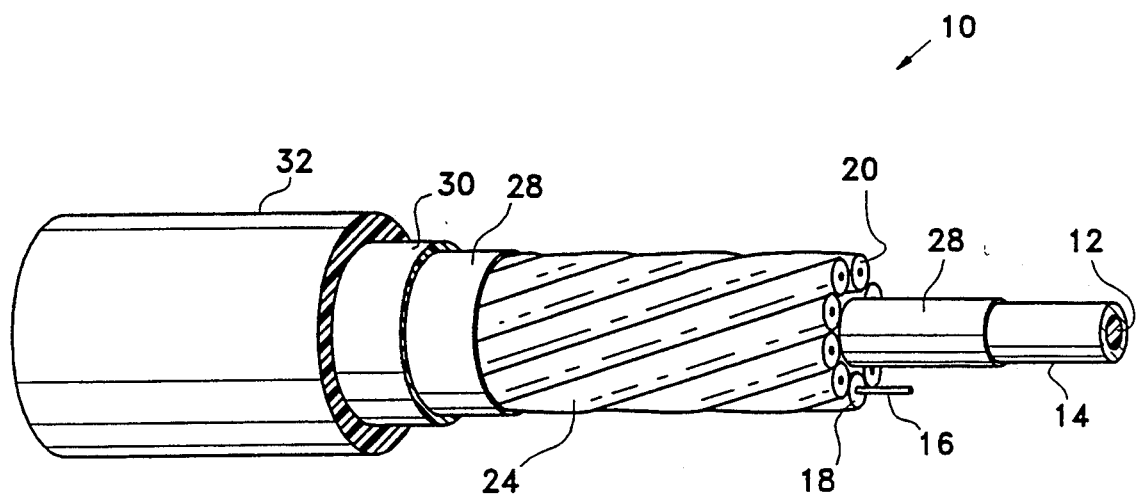
FIG. 2 shows a perspective view, partially cut away, of the gas blocked cable in FIG. 1.

A high pressure gas blocked cable according to the present invention is referred to in general by numeral 10.

The core 12 of cable 10 is a fiberglass epoxy rod. This rod has a jacket or topcoat 14 of EVA-PE copolymer, which is a blend of ethylene vinyl acetate and polyethylene. The EVA component improves the adhesive qualities of the polyethylene base compound.

Ethylene vinyl acetate copolymers are a series of copolymers with vinyl acetate ranging from 10% to 55% incorporated by weight. They exhibit excellent properties, especially in tack and weathering characteristics. EVA copolymers are compatible with many tackifiers and both natural and synthetic polymers used in adhesive formulations. Adhesives with good low temperature properties such as resiliency and elasticity can be prepared using these copolymers.

Fiber 16 is a glass core clad with an overall acrylate buffer material and is used to conduct optical signals. Fiber 16 is enclosed in tube 18 which is made of plastic polybutylene terephthalate (PBT). Polybutylene terephthalate is an engineering thermoplastic material having good physical properties, chemical resistance, and is commonly used as the buffer tube material of choice in communication fiber optic loose buffer tubes.

Gel 20 fills the area between fiber 16 and buffer tube 18. Gel 20 is usually inorganic, gelled, synthetic grease. It is a type of hydrocarbon grease filled with silica to provide relatively stable viscosity throughout the fibers temperature use range. Other material such as petroleum or waxed based greases may be substituted.

Filling 28 is used to fill the interstitial space between epoxy rod 12 and buffer tube 18. Filler may be an EVA and EAA blend. An acid terpolymer skin 24 or topcoat is applied over tube 18 and bonds with the filler material 28 and tube 18. The filler material 28 and the buffer tube 18 would normally not bond to each other in a satisfactory manner, allowing high pressure gasses to escape along the buffer tubes.

The acid terpolymer 24 has been found to function best when it is applied to the buffer tube while it is still warm or hot, i.e., when it is heat-bonded to the buffer tube. Thus, the acid terpolymer 24 may be applied to the buffer tube during cable 10 assembly through a coextrusion process. Coextrusion is a manufacturing method wherein a thin layer of acid terpolymer is extruded simultaneously 360 degrees around the inner PBT tube material.

In coextrusion process two polymers are simultaneously extruded in layers by using two separate extruders and a common cross head, which has been designed and machined so two materials flow separately into the cross head and flow in such a manner as to form a first material (PBT) as a tube 18 over the substrate, fiber 16 and grease gel 20. Then the second material, acid terpolymer 24 will form a second layer over the PBT.

Thermo Plastic Elastomer 30 (TPE) is black in color and designed to block UV light from the interior of the cable. Outer polyethylene jacket 32 can be low, medium, or high density polyethylene with special UV resistant orange color.

We claim:

1. A high pressure, gas blocked cable comprising:
   a fiberglass epoxy rod;
   at least one optical fiber adjacent said rod;
   a buffer tube enclosing said at least one optical fiber;
   filler surrounding said buffer tube;
   an inner jacket enclosing said fiber, buffer tube, and fiber epoxy rod;
   wherein an acid terpolymer layer surrounds said buffer tube and bonds said buffer tube to said filler in order to prevent migration of high pressure gas.

2. A cable as in claim 1 wherein a gel surrounds said at least one optical fiber and is enclosed by said buffer tube.

3. A cable as in claim 1 wherein an inner jacket is located between said filler and low density outer jacket.

4. A cable as in claim 3 wherein said outer jacket is polyethylene.

5. A cable as in claim 3 wherein said inner jacket is thermo plastic elastomer.

6. A cable as in claim 3 wherein said outer jacket is fluoropolymer.

7. A cable as in claim 1, wherein said filler includes a material selected from the group consisting of ethylene vinyl acetate and ethylene acrylic acid.

8. A cable as in claim 7, wherein said buffer tube includes polybutylene terephthalate.

9. A cable as in claim 8, wherein said acid terpolymer layer is heat-bonded to said buffer tube.

10. A high pressure, gas blocked cable comprising;
optical fiber;
a buffer tube enclosing said fiber;
filler surrounding said buffer tube;
a jacket surrounding said filler;
wherein an acid terpolymer layer surrounds said buffer tube and bonds said buffer tube to said filler in order to prevent migration of high pressure gas.

11. A cable as in claim 10, wherein said filler includes a material selected from the group consisting of ethylene vinyl acetate and ethylene acrylic acid.

12. A cable as in claim 11, wherein said buffer tube includes polybutylene terephthalate.

13. A cable as in claim 12, wherein said acid terpolymer layer is heat-bonded to said buffer tube.

14. A fiber optic cable comprising
a fiberglass rod,
a plurality of optical fibers arranged around said rod, each of said fibers being enclosed by a buffer tube,
said buffer tubes and said rod having an interstitial space between them, and
a filler that fills the interstitial space to prevent the flow of gas along the length of the cable and said filler contains ethylene vinyl acetate and ethylene acrylic acid.

15. A fiber optic cable comprising
a fiberglass rod,
a plurality of optical fibers arranged around said rod, each of said fibers being enclosed by a buffer tube,
said buffer tubes and said rod having an interstitial space between them, and
a filler that fills the interstitial space to prevent the flow of gas along the length of the cable, an outer jacket surrounding said rod and said fibers, and said filler being contained within said jacket.

16. The fiber optic cable of claim 15 wherein said filler contains ethylene vinyl acetate and ethylene acrylic acid.

* * * * *